3,134,791
CYCLOPENTANOPHENANTHRENE COMPOUNDS AND PROCESS
Carl Djerassi and Howard J. Ringold, Mexico City, Mexico, assignors, by mesne assignments, to Syntex Corporation, a corporation of Panama
No Drawing. Filed July 8, 1959, Ser. No. 825,664
Claims priority, application Mexico July 9, 1958
8 Claims. (Cl. 260—397.4)

The present invention relates to cyclopentanophenanthrene derivatives and to a method for preparing the same.

In particular, it relates to the novel 16α-methyl-6α-halo (fluro, chloro or bromo)-17α-acyloxy-progesterone, which compounds are effective progestational agents by the oral or parenteral route, and which may be expressed by the following formula:

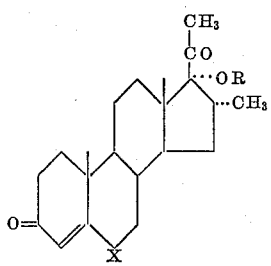

and comprises also their 1-dehydro derivatives which may be expressed by the following formula:

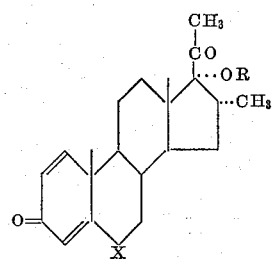

In both these formulas X represents a halogen selected from the group of fluorine, chlorine and bromine, which may be in the α- or β-position, and R represents a hydrocarbon carboxylic acid acyl group of up to 12 carbon atoms, of straight or branched chain, saturated or unsaturated, cyclic or mixed cyclic-aliphatic, substituted or not with functional groups, such as methoxy or halogen for example. Among other C-17 esters, there may be the acetate, propionate, butyrate, t-butyrate, hemisuccinate, enanthate, caproate, benzoate, trimethylacetate, phenoxyacetate, phenylpropionate, cyclopentylpropionate and β-chloropropionate.

The following equation illustrates a process for preparing the novel compounds of the present invention:

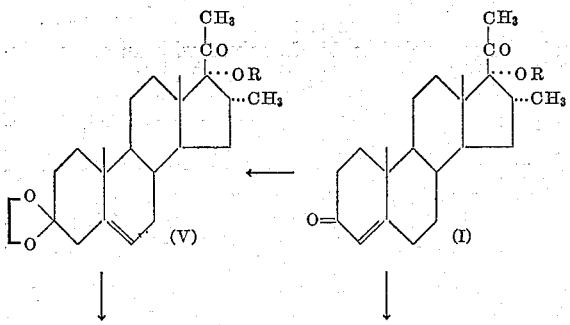

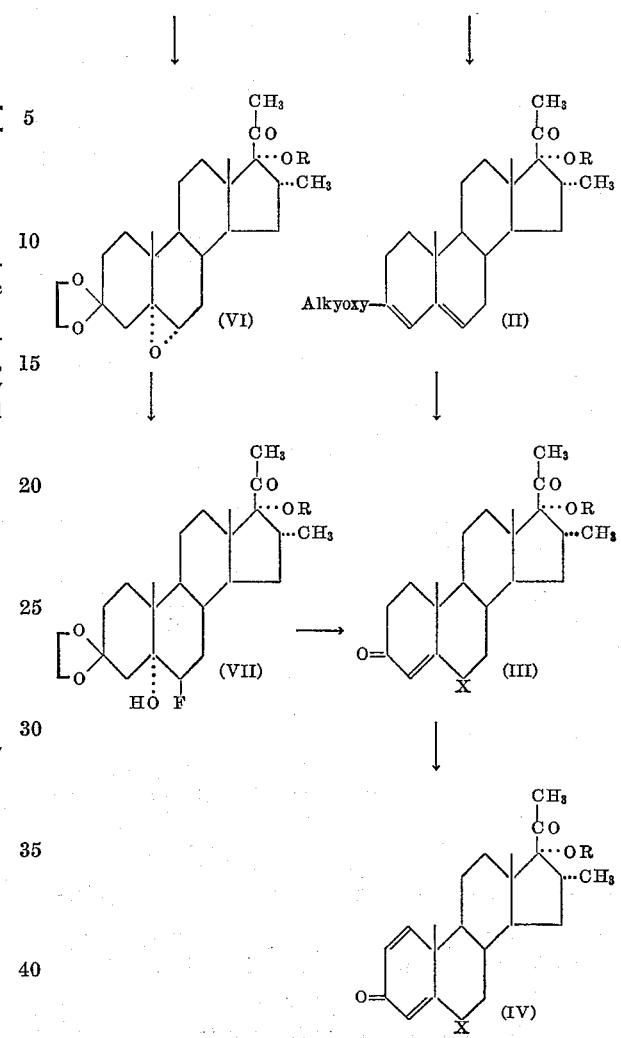

In the above equation X and R represent the same groups as heretofore set forth.

In practicing the process as heretofore set forth an ester of 16α-methyl-17α-hydroxy-progesterone (I) disclosed and claimed in U.S. application Serial No. 773,830, filed November 14, 1958, was used as a starting material.

To prepare the novel 6-chloro and 6-bromo derivatives, the above compound was treated with a triester of orthoformic acid in dioxane solution and in the presence of p-toluenesulfonic acid and there was obtained a 3-alkyl-enol-ether (II); this compound was treated with hypochlorous acid or hypobromous acid, using for this reaction any reagent capable of generating such acids, such as N-chloro or N-bromo amides or imides, hypochlorites or hypobromites of alkali or alkaline earth metals; preferably there were used the corresponding N-halo succinimides in acetone solution and in the presence of acetic acid and sodium acetate. Thus there was produced a 16α-methyl-6β-chloro-17α-acyloxy-progesterone (III; X=β-chloro) or a 16α-methyl-6β-bromo-17α-acyloxy progesterone (III; X=β-bromo) respectively, which were dehydrogenated between C-1 and C-2 by microbiological methods, for example by incubation with species of Corynebacterium simplex, or by means of purely chemical methods, such as refluxing with selenium dioxide in mixture with t-butanol, in the presence of pyridine, under an atmosphere of nitrogen and for a period between 12 and 96 hours, to yield a 16α-methyl-6β-halo-17α-acyloxy-$\Delta^{1,4}$-pregnadien-3,20-dione (IV).

By treatment with acid under vigorous conditions the steric configuration at C–6 was inverted to yield a 16α-methyl-6α-halo-17α-acyloxy-Δ$^{1,4}$-pregnadien-3,20 - dione; preferably this reaction was carried out with dry hydrogen chloride in glacial acetic acid solution, at temperatures around 15° C.

To prepare the novel 6-fluoro derivatives, 16α-methyl-17α-acyloxy-progesterone was treated with an alkyleneglycol to yield a 16α-methyl-3-alkylenedioxy-17α-acyloxy-Δ$^5$-pregnen-20-one, preferably 16α-methyl-3-ethylenedioxy-17α-acyloxy-Δ$^5$-pregnen-20-one (V) by refluxing with ethylene glycol in mixture with benzene, under anhydrous conditions and in the presence of p-toluenesulfonic acid. The nuclear double bond of V was epoxidized by reaction with a peracid, for example by reaction with monoperphthalic acid in a mixture of ether and chloroform. The resulting 16α-methyl-3-ethylenedioxy-17α-acyloxy-5α,6α-oxido-pregnan-20-one (VI) was treated with boron trifluoride in a mixture of ether-benzene, at room temperature, and thus there was produced the corresponding 16α-methyl-3-ethylenedioxy-17α-acyloxy-6β-fluoro - pregnan-5α-ol-20-one (VII). By reaction with concentrated aqueous hydrochloric acid in acetic acid solution at room temperature, the ketal group was hydrolyzed with simultaneous dehydration at C–5 to produce the 16α-methyl-6β-fluoro - 17α - acyloxy - progesterone (III). This compound was dehydrogenated with selenium dioxide to form 16α-methyl-6β-fluoro-17α-acyloxy-Δ$^{1,4}$ - pregnadien - 3,20-dione (IV; X=β-fluoro) the steric configuration at C–6 was inverted to produce 16α-methyl-6α-fluoro-17α-acyloxy-Δ$^{1,4}$-pregnadien-3,20-dione (IV; X=α-fluoro).

Alternatively, by treatment of the 5-hydroxy compound (VII) with dry hydrogen chloride in glacial acetic acid solution at a temperature around 15° C. for approximately 4 hours, there was achieved simultaneously the hydrolysis of the ketal group, the dehydration at C–5 as well as the inversion of the atomic configuration at C–6, to yield 16α-methyl-6α-fluoro-17α-acyloxy-progesterone. Subsequent refluxing with selenium dioxide produced 16 α- methyl - 6α - fluoro-17α-acyloxy-Δ$^{1,4}$-pregnadien-3,20-dione.

The following specific examples serve to illustrate but are not intended to limit the present invention.

Example I

To a solution of 4 g. of 16α-methyl-17α-acetoxy-progesterone in 28 cc. of anhydrous dioxane there was added 4 cc. of ethyl orthoformate and 120 mg. of p-toluenesulfonic monohydrate acid and the mixture was stirred for 30 minutes; 10 cc. of pyridine and 400 cc. of water were added with stirring and cooling and the reaction product was extracted with ether, washed with water, dried over anhydrous sodium sulfate and evaporated. The residue crystallized from methanol-water to give 16α-methyl-17α-acetoxy-3-ethoxy-Δ$^{3,5}$-pregnadien-20-one.

3 g. of the above compound was dissolved in 90 cc. of acetone, cooled to 0° C., mixed with 1.6 g. of anhydrous sodium acetate and 3 g. of N-chlorosuccinimide followed by 1.5 cc. of glacial acetic acid and the mixture was stirred for 3 hours at a temperature between 0° and 5° C. 500 cc. of ice water was added and the mixture was kept overnight at 0° C.; the precipitate was collected by filtration, washed with water, dried and recrystallized from ether-acetone containing a few drops of pyridine. There was thus obtained 16α-methyl-6β-chloro-17α-acetoxy-progesterone.

A mixture of 2 g. of 16α-methyl-6β-chloro-17α-acetoxy-progesterone, 100 cc. of t-butanol, 0.8 g. of selenium dioxide and 0.4 cc. of pyridine was refluxed for 48 hours under an atmosphere of nitrogen and then filtered through celite; the filtrate was evaporated under reduced pressure. The residue was dissolved in acetone, refluxed with decolorizing charcoal for 1 hour, filtered through celite, evaporated to dryness and the residue was purified by chromatography on neutral alumina. There was thus obtained 16α - methyl-6β-chloro-17α-acetoxy-Δ$^{1,4}$-pregnadien-3,20-dione.

1.5 g. of the above compound was dissolved in 75 cc. of glacial acetic acid and a slow stream of dry hydrogen chloride was introduced into the solution for 4 hours, while the temperature was maintained below 15° C. After pouring into ice water the precipitate was filtered and recrystallized from acetone hexane, thus giving 16α-methyl - 6α - chloro-17α-acetoxy-Δ$^{1,4}$-pregnadien-3,20-dione.

Example II

Substituting in the method of the previous example the N-chlorosuccinimide by N-bromosuccinimide, there was obtained, via 16α-methyl-6β-bromo-17α-acetoxyprogesterone and 16αmethyl-6β-bromo-17α-acetoxy-Δ$^{1,4}$-pregnadiene-3,20-dione, the 16α-methyl-6α-bromo-17α-acetoxy-Δ$^{1,4}$-pregnadien-3,20-dione.

Example III

In the previous examples there was changed the order of the reactions: the steric configuration at C–6 of 16α-methyl - 6β-halo-17α-acetoxyprogesterone was first inverted and the resulting 16α-methyl-6α-halo-17-acetoxyprogesterone was dehydrogenated to its 1-dehydro analog.

Example IV

In the methods of Examples I–III there was substituted the acetate of the starting material by another ester of any hydrocarbon carboxylic acid having up to 12 carbon atoms and/or the ethyl orthoformate by another ester of orthoformic acid. Specifically, the caporate of 16α-methyl-17α-hydroxyprogesterone was treated with ethyl orthoformate to obtain 16α-methyl-17α-caproxy-3-ethoxy-Δ$^{3,5}$-pregnadien-20-one and the latter was converted, by reaction with N-chlorosuccinimide, into 16α-methyl-6β-chloro-17α-caproxy-progesterone, whose steric configuration at C–6 was inverted by treatment with dry hydrogen chloride in glacial acetic acid solution, and further dehydrogenation of the product afforded 16α-methyl - 6α - chloro-17α-caproxy-Δ$^{1,4}$-pregnadien-3,20-dione. The cyclopentylpropionate of 16α-methyl-17α-hydroxyprogesterone was converted by reaction with the tripropyl ester of orthoformic acid into 16α-methyl-17α-cyclopentylpropionoxy - 3 - propoxy-Δ$^{3,5}$-pregnadien-20-one, which was treated with N-bromosuccinimide and then with dry hydrogen chloride, to produce 16α-methyl-6α-bromo-17α-cyclopentylpropionoxy-progesterone and then 16α - methyl-6α-bromo-17α-cyclopentylpropionoxy-Δ$^{1,4}$-pregnadien-3,20-dione.

Example V

A mixture of 5 g. of 16α-methyl-17α-acetoxy-progesterone, 100 cc. of anhydrous benzene, 35 cc. of ethylene glycol distilled over sodium hydroxide and 600 mg. of p-toluenesulfonic acid was refluxed for 8 hours, with the use of an adapter for the continuous removal of water. The mixture was cooled, washed with aqueous sodium bicarbonate solution and with water, dried over anhydrous sodium sulfate and evaporated to dryness. The residue crystallized from acetone-hexane to give 16α-methyl-17α-acetoxy-3-ethylenedioxy-Δ$^5$-pregnen-20-one.

4 g. of the above compound was dissolved in 80 cc. of chloroform, cooled to 0° C., mixed with an ether solution of perphthalic acid containing 1.2 molar equivalents of the reagent kept in the dark for 16 hours at a temperature between 0 and 5° C., water was added, the organic layer was separated and washed with aqueous sodium bicarbonate solution and water to neutral, dried over anhydrous sodium sulfate and evaporated. The residue crystallized from acetone-hexane to furnish 16α-methyl-17α - acetoxy - 3-ethylenedioxy-5α,6α-oxido-pregnan-20-one.

To a solution of 3 g. of the above compound in 300 cc. of a mixture of equal parts of ether and benzene there was added 3 cc. of boron trifluoride etherate and the mixture was kept for 3 hours at room temperature, water was added, the organic layer was washed with water, dried over anhydrous sodium sulfate and evaporated to dryness. Chromatography of the residue on neutral alumina yielded 16α-methyl-6β-fluoro-17α-acetoxy-3-ethylenedioxy-pregnan-5α-ol-20-one.

To a solution of the above compound in 100 cc. of acetic acid there was added 2 cc. of concentrated aqueous hydrochloric acid and the mixture was kept at room temperature for half an hour and diluted with water; the precipitate was filtered, washed with water, dried and recrystallized from acetone-hexane, thus producing 16α-methyl-6β-fluoro-17α-acetoxy-progesterone.

By subsequent refluxing with selenium dioxide, in accordance with Example I, there was obtained 16α-methyl-6β-fluoro-17α-acetoxy-$\Delta^{1,4}$-pregnadien-3,20-dione.

Upon subsequent treatment with dry hydrogen chloride there was obtained the 6α-isomer of the latter compound.

*Example VI*

2 g. of 16α-methyl-6β-fluoro-17α-acetoxy-3-ethylenedioxypregnan-5α-ol-20-one, intermediate compound in the previous example, was treated in glacial acetic acid solution with dry hydrogen chloride, such as has been described in Example I, to produce 16α-methyl-6α-fluoro-17α-acetoxy-progesterone, which was then dehydrogenated to 16α-methyl-6α-fluoro-17α-acetoxy-$\Delta^{1,4}$-pregnadien-3,20-dione.

*Example VII*

In the methods of the Examples V and VI, there was substituted the ester of the starting material by an ester of any carboxylic acid having up to 12 carbon atoms, and/or the ethyleneglycol by another alkyleneglycol. Specifically, 16α-methyl-17α-propionoxyprogesterone was treated with propyleneglycol to produce 16α-methyl-17α-propionoxy-3-propylenedioxy-$\Delta^5$-pregnen-20-one, which upon reaction with the peracid gave rise to the formation of 16α-methyl-17α-propionoxy-3-propylenedioxy - 5α,6α - oxido-pregnan-20-one; treatment of the latter with boron trifluoride afforded 16α-methyl-6β-fluoro-17α-propionoxy-3-propylenedioxy-5α,6α-oxido-pregnan-5α-ol-20-one which was converted into 16α - methyl-6β-fluoro-17α-propionoxyprogesterone, then into its 6α-isomer and finally into the 1-dehydro analog of the latter.

We claim:

1. 16α - methyl - 6-chloro-17α-acyloxy-$\Delta^4$-pregnen-3,20-dione, wherein the acyloxy group in that of a hydrocarbon carboxylic acid of up to 12 carbon atoms.

2. 16α-methyl-6-bromo-17α-acyloxy-$\Delta^4$ - pregnen-3,20-dione, wherein the acyloxy group is that of a hydrocarbon carboxylic acid of up to 12 carbon atoms.

3. 16α-methyl-6α-chloro-17α-acetoxy-$\Delta^4$-pregnen - 3,20-dione.

4. 16α-methyl-6α-chloro-17α-caproxy-$\Delta^4$-pregnen - 3,20-dione.

5. 16α-methyl-6-chloro - 17α - acyloxy-$\Delta^{1,4}$-pregnadien-3,20-dione, wherein the acyloxy group is that of a hydrocarbon carboxylic acid of up to 12 carbon atoms.

6. 16α-methyl-6-bromo-17α-acyloxy - $\Delta^{1,4}$ - pregnadien-3,20-dione, wherein the acyloxy group is that of a hydrocarbon carboxylic acid of up to 12 carbon atoms.

7. 16α-methyl-6α - chloro-17α-acetoxy-$\Delta^{1,4}$-pregnadien-3,20-dione.

8. 16α-methyl-6α-chloro-17α-caproxy - $\Delta^{1,4}$-pregnadien-3,20-dione.

References Cited in the file of this patent

UNITED STATES PATENTS

| | | |
|---|---|---|
| 2,838,496 | Babcock et al. | June 10, 1958 |
| 2,838,531 | Babcock et al. | June 10, 1958 |
| 2,950,298 | Elks et al. | Aug. 23, 1960 |

OTHER REFERENCES

Ringold et al.: Journal Amer. Chem. Soc. (1959), vol. 81, page 3485 relied on.